United States Patent

Bjornson et al.

[15] 3,674,668
[45] July 4, 1972

[54] ELECTRIC ARC PROCESS FOR MAKING HYDROGEN CYANIDE, ACETYLENE AND ACRYLONITRILE

[72] Inventors: Geir Bjornson; Homer M. Fox, both of Bartlesville, Okla.

[73] Assignee: Philips Petroleum Company

[22] Filed: Feb. 24, 1969

[21] Appl. No.: 801,364

[52] U.S. Cl. ............................................204/171, 204/323
[51] Int. Cl. ........................................B01k 1/00, C22d 7/08
[58] Field of Search ..........................204/171, 178, 323–328

[56] References Cited

UNITED STATES PATENTS

| | | | |
|---|---|---|---|
| 3,168,592 | 2/1965 | Cichelli et al. | 204/171 X |
| 3,460,902 | 8/1969 | Hirayama et al. | 204/171 |

*Primary Examiner*—John H. Mack
*Assistant Examiner*—Neil A. Kaplan
*Attorney*—Young and Quigg

[57] ABSTRACT

A lower hydrocarbon having from one to eight carbon atoms is passed through an electric arc, heated therein above about 1,000° F., and immediately mixed with nitrogen or a nitrogen-containing compound, which mixture immediately reacts to form acetylene, hydrogen cyanide and other products, which products are quenched below about 1,000° F. If desired, the resulting products are further reacted to form acrylonitrile from the further reaction of the acetylene with the hydrogen cyanide present. By not passing the nitrogen-containing compound through the arc during the process, severe errosion of the electrodes is avoided. By passing only the lower hydrocarbon through the arc during the process, it is not necessary to employ any inert arc gas, which would increase the cost of operation and the difficulty of separation of products. Because of lower cost and availability, methane and ammonia are preferred as the two reactants. Nitrogen and other nitrogen-containing compounds are disclosed as suitable nitrogen sources to replace the ammonia.

Apparatus features are the combination of a rotating arc heater with a fluidized bed arc effluent quench and feed preheater and, if desired, fluidized bed acrylonitrile from hydrogen and acetylene reactor followed, if desired, by a suitable series of fractionators.

6 Claims, 2 Drawing Figures

INVENTORS
G. BJORNSON
H. M. FOX

BY Young & Quigg
ATTORNEYS

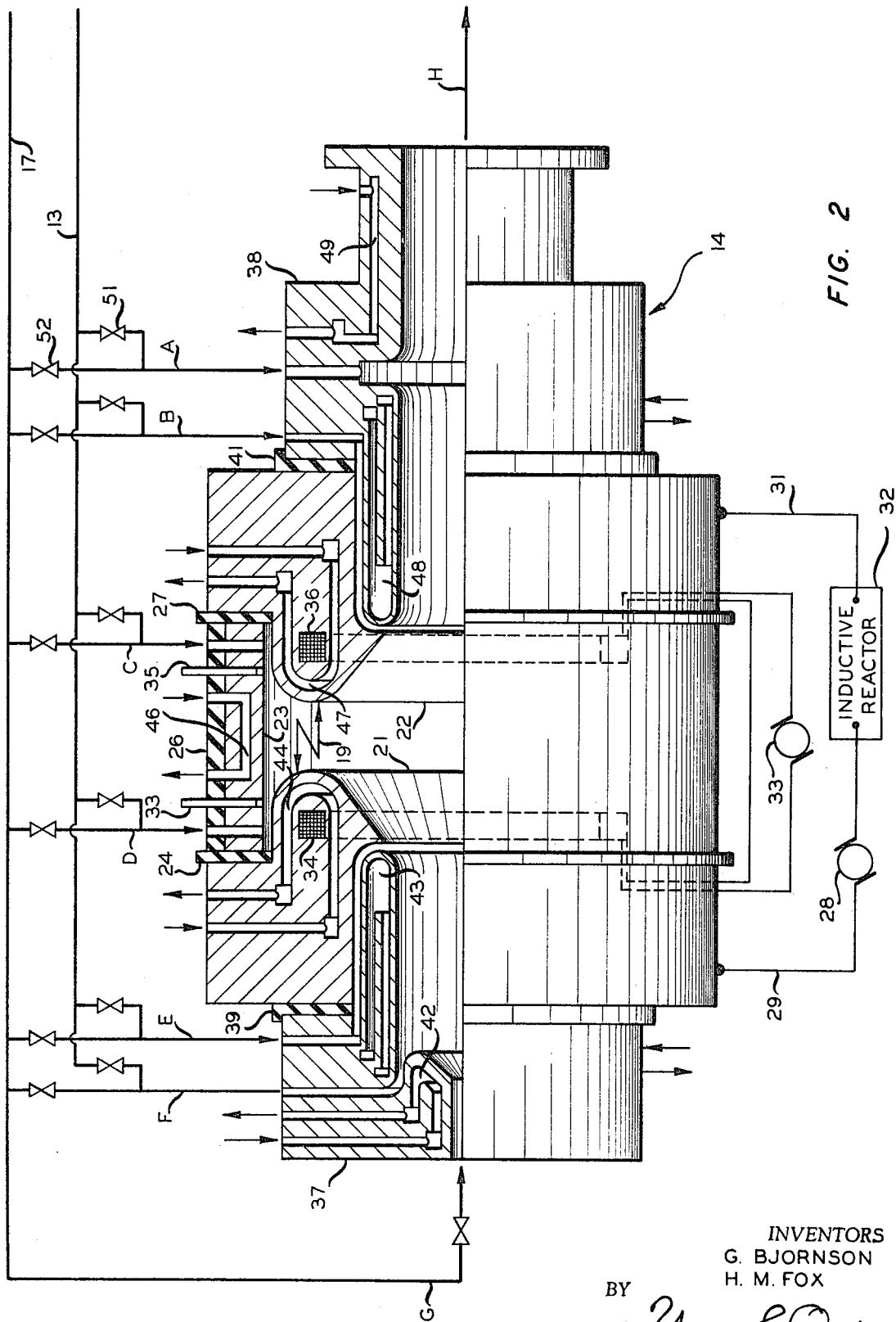

ial and apparatus for making hydrogen cyanide, acetylene and acrylonitrile from the reaction of $C_1$ to $C_8$ hydrocarbons, preferably methane, with nitrogen or nitrogen-containing compounds, preferably ammonia, characterized by the fact that none of the nitrogen or nitrogen-containing compounds passes through the arc during the process, and that only the hydrocarbons pass through the arc during the process without any inert arc gas, such as hydrogen, argon, nitrogen or mixtures thereof. The invention is further characterized in that it can simultaneously produce substantial quantities of both acetylene and hydrogen cyanide in a single stream, which stream is suitable for direct conversion to acrylonitrile.

In the prior art, as shown in U.S. Pats. to Perry, No. 2,682,447 and Hammer, No. 3,213,260, it was old to pass all the reactants through the electrical arc, which practice is found to be destructive to the electrodes, causing them to erode rapidly. It was also old to pass only an inert arc gas through the electrical arc, as shown in Case U.S. Pat. No. 3,114,691 or Begley et al. U.S. Pat. No. 3,419,597, with resulting complications and increased cost in operation and in separation of the products and the arc gas, and recycle of the arc gas.

The present invention unexpectedly demonstrates that by passing only the hydrocarbon through the electrical arc and immediately mixing in the nitrogen or nitrogen-containing reactant, the difficulties of the prior art as to erosion of electrodes or difficult separation of the inert arc gases are both avoided, and the process and apparatus operate to give good yields of the desired products.

The present invention employs several novel combinations and subcombinations of apparatus in carrying out the process. The combinations of a rotating arc heater somewhat similar to Hammer U.S. Pat. No. 3,213,260, with a fluidized bed quench and feed heater somewhat similar to 2 of Rex U.S. Pat. No. 2,902,437, followed if desired by a fluidized bed reactor somewhat similar to 1 of Rex, cited, followed if desired by a series of fractionators somewhat similar to those in Perry U.S. Pat. No. 2,682,447 are all regarded as patentable improvements in a combined apparatus for making hydrogen cyanide, acetylene and acrylonitrile.

One object of the present invention is to provide a novel process of making hydrogen cyanide, acetylene and acrylonitrile.

Another object is to provide such processes which avoid excessive electrode erosion.

Another object is to provide such processes which avoid the use of an inert arc gas.

Another object is to provide apparatus for carrying out the above-described processes of each of the preceding objects.

Numerous other objects and advantages will be apparent to those skilled in the art upon reading the accompanying specification, claims and drawings.

In the drawings:

FIG. 2 is an elevational view of the arc heater of FIG. 1, with the upper portion in cross section at its diameter to show the features of construction of the arc heater as actually used in obtaining the data of the examples.

Figures 1, 3:
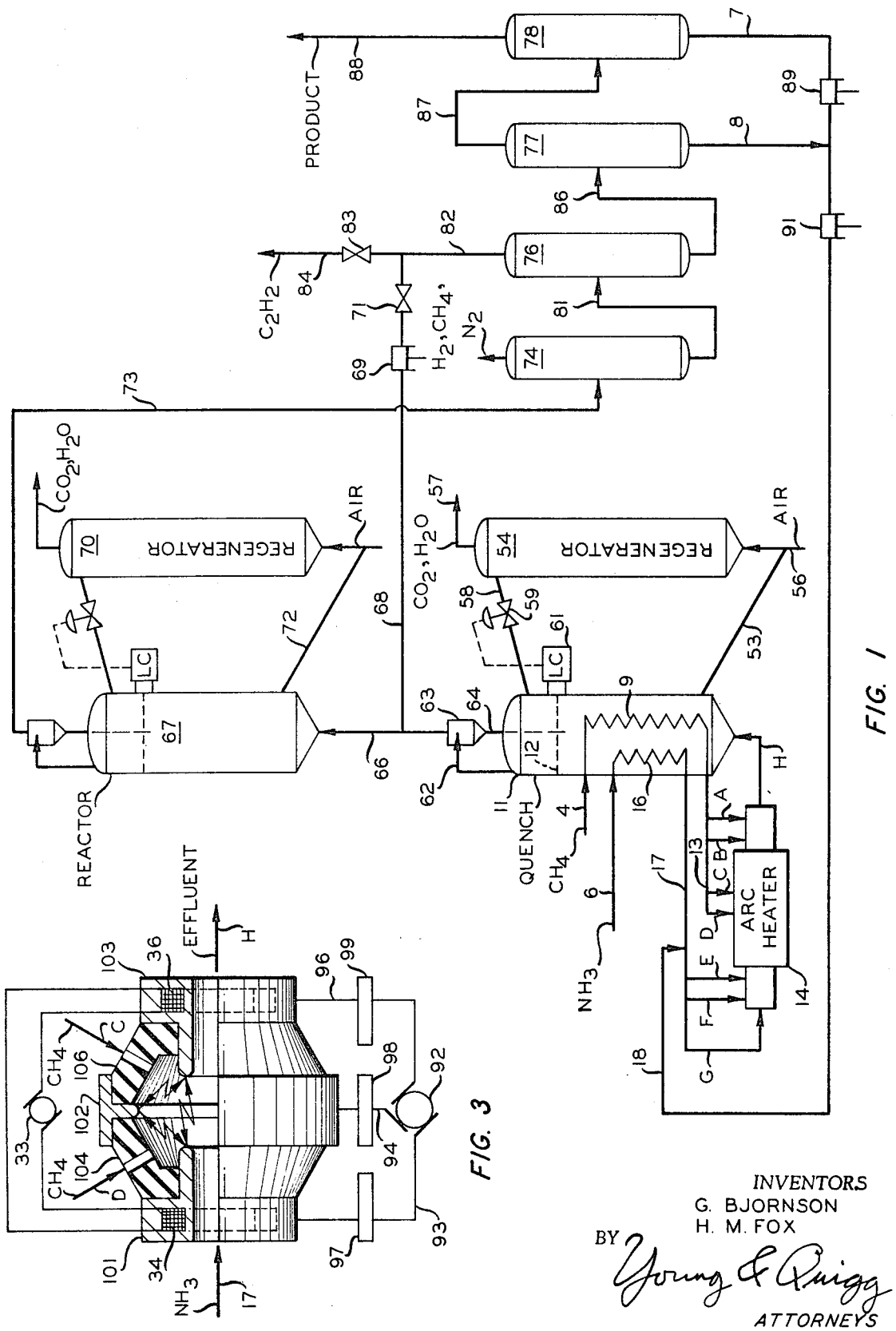
FIG. 1 is a flow diagram of the process of this invention, showing the apparatus in schematic form.
FIG. 3 is a view similar to FIG. 1 of a second form of arc heater employing three-phase alternating current, which may be used in the practice of the present invention.

The utility of acetylene, acrylonitrile and hydrogen cyanide is well known.

In 1960 in the United States, 770 million pounds of acetylene was used in the manufacture of vinyl chloride by the reaction of acetylene and hydrogen chloride, in the formation of neoprene, reaction with hydrogen cyanide to form acrylonitrile, reaction with chlorine to form trichloroethylene on dehydrogenation, reaction with carbon monoxide and alcohol or water to form acrylic acid or its esters, and many other acetylene reaction products useful in polymers, film, sheeting, floor coverings, textile and paper coatings, paints and adhesives. Acetylene can be reacted with acetic acid to form vinyl acetate and polyvinyl acetate useful for latex paint, adhesives, textile finish and many other uses.

In 1960 in the United States, 400 million pounds of acrylonitrile was produced, mainly to be used in the production of acrylic fibers, rugs, fabrics, modacrylic fibers, nitrile rubber and plastics. Many other uses exist and could be listed.

In 1964 in the United States, 445 million pounds of hydrogen cyanide was produced, the chief use being to make acrylonitrile. The next largest use is in making methyl methacrylate, followed by making adiponitrile and next making sodium cyanide. The remaining hydrogen cyanide is used in ferrocyanides, acrylates, ethyl lactate, latic acid, chelating agents, optical laundry bleaches and pharmaceuticals.

Because of the intense heat of the electric arc, any hydrocarbon that will vaporize completely below 500° F. can be heated if necessary and so vaporized and used as hydrocarbon feed stream 4 in FIG. 1; but because of availability, cheapness and because less or no preheat is necessary, methane ($CH_4$) is preferred. However, $C_2$ to $C_8$ hydrocarbons are also preferred to a less degree for reasons similar to methane. They may be paraffinic, olefinic, diolefinic, aromatic, alkyl aromatic or even acetylenic, although obviously their price places an economic disadvantage on all but the paraffinic. One may use in this invention methane, ethane, propane, butane, pentane, hexane, heptane, octane, ethene, propene, butene, pentene, heptene, octene, ethyne, propyne, butyne, pentyne, hexyne, heptyne, octyne, propadiene, butadiene, pentadiene, hexadiene, heptadiene, octadiene, benzene, toluene and xylene almost equally well except for the relative cost of the feedstock in the practice of this invention. Methane is used in the examples below because of its relative cost, availability and low temperature vaporization. Obviously, ethyne would be uneconomical as a feedstock to make acetylene (which is ethyne), but it has utility in making the product acrylonitrile.

Because of the intense heat of the electric arc, nitrogen ($N_2$), hydrazine ($H_2NNH_2$), or any nitrogen-containing organic compound that will vaporize completely below 500° F. can be heated if necessary and so vaporized and used as a nitrogen-containing feed stream 6 in FIG. 1; but because of availability, cheapness and because less or no preheat is necessary, ammonia ($NH_3$) is preferred. However, other nitrogen-containing materials can be used; in particular, organic amines can be used, such as, for example, primary, secondary and tertiary amines or other nitrogen-containing compounds having up to about 12 carbon atoms per molecule. For example, $N_2$, $NH_3$, $H_2NNH_2$, methylamine, triethylamine or pyridine can be used in the practice of this invention almost equally well except for the relative cost of the feedstock. Ammonia is used in the examples below because of its relative cost, availability and low temperature vaporization. Obviously, it would not be economical to use acrylonitrile as a feedstock to make acrylonitrile, but it will be noted in the drawing that in pipe 7 acetonitrile and in pipe 8 propionitrile and heavier nitriles may be recycled to the arc heater as part of the nitrogen-containing feedstock 6. The heavier nitriles in line 8 may include trans-1-cyanobutene, cyanobutene, 2-cyanobutadiene, 3-cyanopropene, trans-1-cyanobutene-2, cis-1-cyanopropene, cis-1-cyanobutene-2, trans-cyanobutadiene, cis-cyanobutadiene and some others.

In FIG. 1 the hydrocarbon feedstock 4 is preferably preheated by indirect heat exchange in heating coil 9 in quench chamber 11 with a fluidized bed of material having an upper level 12 to its dense phase. From coil 9 the preheated hydrocarbon feedstock goes through line 13 preferably to inlets A, B, C and/or D of the arc heater 14, although as more fully shown in FIG. 2 some of the hydrocarbon feedstock could, if desired, go to inlets E, F and G. The nitrogen-containing stream 6 is preferably similarly preheated in heating coil 16 and passes through line 17 where it may have recycle products added through line 18 and preferably passes to inlets E, F and/or G of the arc heater 14, although as more fully shown in FIG. 2 it could, if desired, go to inlets A and B, but would never go to inlets C and D except for purposes of providing a comparative run showing the advantages of not running the nitrogen-containing stream through the electric arc per se. However, the arc 19 is preferably started by injecting nitrogen through inlets C and D and then when the arc is established simultaneously switching to hydrocarbon feed through C and D and nitrogen-containing feed through inlets A, B, E, F or G. Starting the arc with hydrocarbon feed through inlets C and D may cause carbon deposits to form in the arc heater, but once the arc is established this carbon deposit is no longer a problem.

In the present method for the concurrent preparation of substantial quantities of HCN and acetylene by pyrolysis of a lower hydrocarbon such as methane in line 13 with a nitrogen-containing material such as ammonia in line 17 in a high-performance arc heater generally designated as 14 in FIG. 2, preferably utilizing a magnetically-rotating arc 19 between two toroidal electrodes 21 and 22, it has been found that improved operation can be obtained by passing only the hydrocarbon into inlets C and/or D and through the actual region of the arc 19 and introducing the ammonia at a point A, B, E, F and/or G where it bypasses the intense arc region. While inlets A and B are operable in the practice of this invention, inlets E, F and/or G are preferred for the entry of the ammonia, as then it passes by the arc 19 but spaced therefrom by pyrolyzing hydrocarbons from inlets C and/or D. Some hydrocarbons can enter inlets A, B, E, F and G also, as it is immaterial whether all the hydrocarbons go through arc 19, but none of the nitrogen-containing material should be allowed to pass through arc 19, because then it will cause the metal of electrodes 21 and 22 to vaporize and rapidly erode, which obviously is highly undesirable.

The proportions of nitrogen-containing feedstock to hydrocarbon feedstocks will vary depending upon the feeds used, but will be such to provide the desired ratio of acetylene to hydrogen cyanide in the effluent. When the feeds are ammonia and methane, the ammonia feed rate is frequently in the range of 25–40 weight percent of the methane rate.

Arc heater 14 comprises in combination two annular copper electrodes 21 and 22 separated by an annular arc-establishing plate 23 spaced from each electrode by electrical insulating plates 24, 26 and 27 made of glass, Micarta or other known suitable heat-resistant electrical insulation. Opposite poles of an electrical current generator 28 are connected by wires 29 and 31 to electrodes 21 and 22, respectively; and when 28 is an alternating current generator, it is preferred to have an inductive reactor 32 in series in one of the wires to provide an inductive kick to reignite the arc on each half of the A. C. voltage wave. Suitable chromium and copper alloys are known which can be used instead of pure copper for electrodes 21 and 22. When 28 is a direct current generator, then inductive reactor 32 preferably is omitted.

Materials which are to pass directly through the arc 19 are supplied through inlets C and/or D. In starting up the arc 19, it is preferred to use nitrogen as the gas introduced at C and D before any hydrocarbon or ammonia is introduced. Metal starting pins 33 and 35 are pushed into contact with electrodes 21 and 22, generator 28 is started, and pins 33 and 35 are then withdrawn to the position shown, creating two arcs (not shown) from 21 to 23 and from 23 to 22. The gas entering through C and/or D and the magnetic field created by current from generator 33 in one or both of annular magnetic field coils 34 and 36 move the two arcs until they meet in the center of plate 23 and the joined arc 19 then pulls loose from plate 23 and runs directly from electrode 21 to electrode 22. The magnetic field of coils 34 and/or 36 rotates the arc 19 so it will distribute its erosion of electrodes 21 and 22 evenly. The operation of field coils 34 and 36 is similar to that of coils 28 and 30 of Hammer U.S. Pat. No. 3,213,260 patented Oct. 19, 1965, and needs no further explanation. It is preferred that the arc rotates at a speed which is at least 2,000 ft./sec.

The hydrocarbon feed, for example methane, is then immediately and completely substituted for the nitrogen in inlets C and D, and no more nitrogen-containing material passes through arc 19. The nitrogen or nitrogen-containing material, such as ammonia, is then injected into the arc heater through inlets A, B, E, F or G and the mixed effluents emerge through outlet H into the quench 11 of FIG. 1. The conditions of operation will be such that from about 2,800 to about 10,000, preferably from about 6,000 to about 8,000, B.t.u. are absorbed by each pound of reaction mixture. Short residence times, for example 0.001 to 0.1 second, are generally used. Any convenient pressure, including atmospheric pressure, is suitable.

In FIG. 2, the electrodes 21 and 22 may be protected by annular heat shields 37 and 38 made of any noncorrosive metal, such as brass, stainless steel or the like, preferably separated from electrodes 21 and 22 by electrical insulation 39 and 41. Inlets A, B, C, D, E, F, G and outlet H are also preferably provided with electrically-insulated pipe sections so that arc 19 is confined to electrodes 21 and 22 and does not lose current by short circuits in the inlet pipes.

Preferably, all parts 21, 22, 23, 37 and 38 are water cooled. The water cooling spaces 42, 43, 44, 46, 47, 48 and 49 are supplied with water and water removed as shown by the arrows. Electrical current losses can be avoided by separate water cooling systems for each water-cooled spot.

Feedstock lines 13 and 17 are connected to inlets A, B, C, D, E, F and G in FIG. 1 by two sets of valves, as by valves 51 and 52 for inlet A. Obviously, by opening and closing selected valves, any feedstock or combination of feedstocks may be injected at each inlet as desired.

In FIG. 1 the effluent from the arc heater 14 passes through outlet line H into the bottom of quench chamber 11 and up through the dense phase of a fluidized bed 12 in indirect heat exchange with the methane in coil 9 and the ammonia in coil 16, thereby quenching the effluent to below about 1,000° F. and preheating the hydrocarbon and ammonia feedstocks. The quenching can be to about 650° to 1,200° F. if desired. The fluidized solid 12 in the heat exchanger can be any conventional particulate solid, such as charcoal, clay or the like. The fluidized solids plus carbon black picked up from the effluent H may be drawn off through line 53 and blown into regenerator 54 with air 56, which will burn off any added carbon black or hydrocarbon as gaseous $CO_2$ and $H_2O$ which passes out line 57 overhead, the regenerated particulate solids returning to quench vessel 11 through line 58 controlled by valve 59 controlled by liquid level controller 61 to maintain the upper level of the dense phase in vessel 11 at 12 as shown.

As common practice in such fluidized bed vessels as 11, the gas above level 12 emerges through exit line 62 tangentially into cyclone separator 63, from which dust is returned through line 64 to a point below level 12, and dust-free gas passes up line 66 into the reactor 67. Recycled acetylene may be added by line 68 and compressor 69, if desired, if valve 71 is opened.

The reactor effluent in pipe 66, being cooled to about 1,000° F. and essentially free of elemental carbon, is conducted to catalytic reactor 67. This catalytic reactor 67 contains any conventional catalyst suitable for converting the acetylene and hydrogen cyanide to acrylonitrile. Preferred catalysts are alkali metal cyanides on suitable catalytic supports, such as charcoal, silica, natural and synthetic aluminosilicates, clays, refractory metal oxides and the like, and mixtures thereof. A particularly preferred catalyst for fluidized bed operation is one containing from about 15 to about 20 weight percent of equal parts by weight of sodium cyanide and potassium cyanide supported on hardwood charcoal which has been pretreated with hot caustic solution to remove a portion of the ash content, and then with hot oxalic acid solution. This catalyst is then blended with a fluidization aid which can be an inert material, such as silica, sand or the like, but preferably can be a material such as an attrition ground silica on which was deposited equal portions of the mixed sodium and potassium cyanides and about 2 weight percent calcium oxide. The temperature within the reaction zone is preferably maintained within the range of from about 650° F. to about 1,200° F., and the feed rate will have a gaseous hourly space velocity in the range of from about 50 to about 3,000 volumes of gas per volume of catalyst per hour.

Catalyst may be drawn out of reactor 67 through line 72 into regenerator 70, which operates the same as regenerator 54 and its corresponding parts 56, 57, 58, 59 and 61. The overhead gas in 67 is removed through line 73 in the same manner as through parts 62, 63 and 64 of vessel 11.

Although fluidized bed operation under these conditions is presently preferred, other catalyst systems and processes (not shown) which will cause hydrogen cyanide and acetylene to combine efficiently to acrylonitrile can be used. For example, this conversion can be carried out in a fixed bed operation within the range of from about 300° F. to about 1,500° F. using a catalyst comprising an oxide of a Group IIB metal of the Periodic Table, preferably zinc oxide or cadmium oxide. Group IIB metals are zinc, cadmium and mercury.

Catalyst is removed from reactor 67 via pipe 72 for disposal and/or regeneration. The effluent from reactor 67 passes via pipe 73 into a separations area shown as separation zones 74, 76, 77 and 78. The effluent in pipe 73 contains, in addition to the acrylonitrile product, nitrogen-containing by-products, such as up to about 10 parts by weight of acetonitrile and of propionitrile, and up to about 2 parts of heavy nitrogen by-products including trans-1-cyanobutene, cyanobutene, 2-cyanobutadiene, 3-cyanopropene, trans-1-cyanobutene-2, cis-1-cyanopropene, cis-1-cyanobutene-2-, trans-cyanobutadiene, cis-cyanobutadiene, and some other heavier materials.

The effluent contained in pipe 73 is first passed into separation zone 74 from which the hydrogen, methane, nitrogen and other light materials are removed in an overhead stream 79. The remainder 81 of the stream is passed into separation zone 76 from which any acetylene present is removed as an overhead 82 and recycled to catalytic reactor 67 by means of pipe 68, or can be drawn off through valve 83 and line 84. The remainder 86 of the product-containing stream is conducted to separation zone 77 from which propionitrile and other heavier nitrogen-containing by-products are removed as an underflow through pipe 8 while an overhead stream containing acetonitrile and acrylonitrile is passed through pipe 87 to separation zone 78 for the separation of acrylonitrile product overhead through pipe 88 and for the removal of acetonitrile as an underflow through pipe 7. Because acrylonitrile and acetonitrile are closely boiling materials, an effective fractional distillation column must be used for this last separation. The acetonitrile and the propionitrile and other heavier nitrogen-containing by-products are advantageously recycled to the arc heater through pipe 18 containing compressors 89 and 91.

Other catalyst systems can result in varying amounts of other impurities or by-products. Appropriate modifications, within the skill of the separation art, can be made in the present separation sequence to carry out any required recycles and product removals.

FIG. 3 is a schematic view of how a three-phase A. C. arc can be used. Three-phase A. C. generator 92 sends separate phase currents through wires 93, 94 and 96 and inductive reactors 97, 98 and 99 to electrodes 101, 102 and 103 separated by electrical insulators 104 and 106. Methane and ammonia are added and effluent removed as shown. Generator 33 and coils 34 and 36 rotate the three arcs.

The invention can be further illustrated by the following examples:

EXAMPLE I

A number of runs where methane and ammonia were converted to acetylene and hydrogen cyanide were carried out using a 1,500 kw. arc heater (Westinghouse Marc 30) of the general type shown schematically in FIG. 2. A ¾-inch gap between the toroidal electrodes was used in these runs and only the upstream field coil 34 was utilized to rotate the arc.

The methane portion of the feed was introduced into the arc heater in the following manner: 5.5 percent through port A, 5.5 percent through port B, 44.5 percent through port C and 44.5 percent through port D. Thus, the bulk of the methane (89 percent) was fed into the heater at upstream ports, that is, at locations where it is passed through the rapidly-rotating arc.

The ammonia portion of the feed, on the other hand, was introduced into the arc heater at downstream ports, that is, at locations where the ammonia did not pass through the actual arc. To by-pass the arc, the ammonia feed stream was divided evenly and introduced into downstream ports E and F.

The effluent from the arc heater was sampled and analyzed. The results of these analyses and other essential conditions of the runs are shown in Table I.

EXAMPLE II

The criticality of the mode of ammonia introduction is illustrated by the results of the three runs in which the ammonia was introduced not according to the process of the invention but at a point upstream of the arc. These runs were made with the same arc heater of Example I and under the same essential conditions except that the ammonia was added through upstream port D. The methane feed was split into several portions and introduced as follows: 8.3 percent into port A, 8.3 percent into port B, 66.8 percent into port C, 8.3 percent into port E and 8.3 percent into port F. Thus, 83.4 percent of the methane and all of the ammonia were introduced into the arc heater so as to pass directly through the intense region of the arc.

In one run lasting about 5 minutes, methane at 332.2 lb./hr. and ammonia at 31.0 lb./hr. were fed into the heater operating at a gross A. C. power level of 890 kw., resulting in a net enthalpy of 5,593 B.t.u./lb. methane plus ammonia feed. Analysis of the effluent showed methane conversion at 78.2 percent and ammonia conversion at 100 percent, but the reactor effluent showed a green color indicating electrode deterioration.

In another subsequent run in the same apparatus, methane at 414.0 lb./hr. and ammonia at 44.1 lb./hr. were fed into the heater operating at a gross A. C. power level of 680 kw. resulting in a net enthalpy of 3,608 B.t.u./lb. methane plus ammonia feed. Analysis of the effluent showed 40 percent methane conversion and 92 percent ammonia conversion. However, the test was terminated after about 2 minutes due to failure of the copper electrodes.

In still another test in essentially the same apparatus, methane at 359 lb./hr. and ammonia at about 60 lb./hr. were fed into the arc heater at a gross A. C. power level of 634 kw. However, after operating at about 4 minutes, the effluent showed green and the electrodes failed, one electrode being ruptured.

These data, considered in relation to the examples of the previous Example I utilizing the invention process, indicate that the point at which the ammonia is fed into the arc heater is critical to the successful operation of the process. In each of the preceding invention runs of Example I, no electrode wear had been observed.

EXAMPLE III

In the arc heater described in Example I, methane is introduced at the same ports with the same distribution, but at a rate of about 500 lb./hr. Ammonia is also introduced as in Example I, but at about 145 lb./hr. About 1,750 kw. of gross power is applied to the arc heater, resulting in a net enthalpy of about 6,530 B.t.u./lb. methane plus ammonia.

Analysis of the effluent shows that an essentially equimolar amount of acetylene and hydrogen cyanide are produced at rates of about 200 lb./hr. each. Such a stream is cooled, filtered, and contacted with a charcoal catalyst promoter with about 10 weight percent KCN and about 10 weight percent NaCN in a fluidized bed reactor operating at about 950° F. to produce acrylonitrile. Nitrogen-containing products other than acrylonitrile are recycled to the arc heater being introduced through the same feed ports as the ammonia feed stream.

TABLE I

| Methane flow rate (lb./hr.) | Ammonia flow rate (lb./hr.) | Gross A.C. power (kw.) | Net enthalpy BTU/lb. $CH_4+NH_3$ | Methane conversion (percent) | Methane converted to— | | Ammonia conversion (percent) | Ammonia converted to hydrogen cyanide (percent) |
|---|---|---|---|---|---|---|---|---|
| | | | | | Acetylene (percent) | Hydrogen cyanide (percent) | | |
| 197.3 | 18.4 | 900 | 6,880 | 98.0 | 41.5 | 4.9 | 100.0 | 55.6 |
| 197.6 | 18.4 | 880 | 7,010 | 98.4 | 48.6 | 4.7 | 100.0 | 53.6 |
| 192.6 | 35.7 | 820 | 5,113 | 94.7 | 57.1 | 4.2 | 100.0 | 23.7 |
| 453.6 | 43.6 | 1,140 | 5,526 | 72.0 | 49.3 | 4.2 | 100.0 | 46.1 |
| 489.6 | 43.6 | 950 | 3,923 | 60.0 | 35.4 | 2.5 | 100.0 | 29.4 |
| 489.6 | 43.6 | 700 | 2,850 | 47.5 | 33.7 | 1.7 | 100.0 | 20.9 |
| 493.2 | 43.6 | 710 | 3,360 | 30.3 | 22.1 | 0.9 | 98.3 | 11.9 |
| 489.6 | 56.4 | 650 | 2,894 | 36.1 | 24.8 | 2.0 | 96.2 | 13.2 |
| 489.6 | 56.4 | 550 | 3,169 | 61.7 | 35.9 | 4.3 | 85.6 | 27.2 |
| 347.4 | 31.0 | 950 | 4,978 | 85.4 | 43.7 | 5.6 | 97.5 | 67.5 |
| 347.4 | 31.0 | 550 | 4,808 | 64.2 | 37.8 | 3.9 | 95.7 | 45.7 |
| 348.5 | 31.0 | 710 | 4,631 | 48.0 | 24.7 | 2.7 | 94.2 | 37.7 |
| 347.8 | 45.4 | 640 | 3,971 | 41.0 | 29.0 | 3.7 | 93.7 | 28.8 |
| 350.3 | 45.4 | 1,010 | 4,860 | 86.1 | 41.5 | 8.3 | 91.7 | 65.0 |
| 315.4 | 45.4 | 550 | 5,400 | 71.4 | 42.5 | 8.1 | 98.6 | 56.4 |
| 322.2 | 31.0 | 750 | 4,810 | 79.1 | 43.7 | 5.9 | 100.0 | 64.8 |
| 329.4 | 31.0 | 710 | 4,029 | 59.0 | 34.0 | 4.4 | 100.0 | 50.0 |

Having described our invention, we claim:

1. A process for the formation of acetylene and hydrogen cyanide comprising the steps of passing a lower $C_1$ to $C_8$ hydrocarbon in a first stream through an electric arc and thereby heating said first stream above about 1,000° F., immediately mixing this first stream with a second stream of a nitrogen-containing compound selected from the group consisting of nitrogen, ammonia, hydrazine and nitrogen-containing organic compounds having from one to 12 carbon atoms per molecule, which second stream has not passed through said arc, and quenching the mixed streams to below about 1,000° F. to thereby produce acetylene and hydrogen cyanide in said mixed streams.

2. The process of claim 1 in which the mixed stream containing acetylene and hydrogen cyanide is passed through a catalytic reaction zone containing a catalyst suitable for converting the acetylene and hydrogen cyanide to acrylonitrile and thereby producing acrylonitrile therefrom.

3. The process of claim 1 in which the hydrocarbon is methane and the nitrogen-containing compound is ammonia.

4. The process of claim 2 in which the hydrocarbon is methane and the nitrogen-containing compound is ammonia.

5. The process of claim 2 in which the catalytic reaction zone comprises a fluidized bed of a catalyst consisting of alkali metal cyanides supported on catalytic supports selected from the group consisting of charcoal, silica, natural and synthetic aluminosilicates, clays, refractory metal oxides and mixtures thereof.

6. The process of claim 2 in which the catalytic reaction zone comprises a fixed bed containing an oxide of a Group IIB metal of the Periodic Table.

* * * * *